[51.]
Joseph Biddle.
Animal-Trap.
No. 118,581.  Patented Aug. 29, 1871.
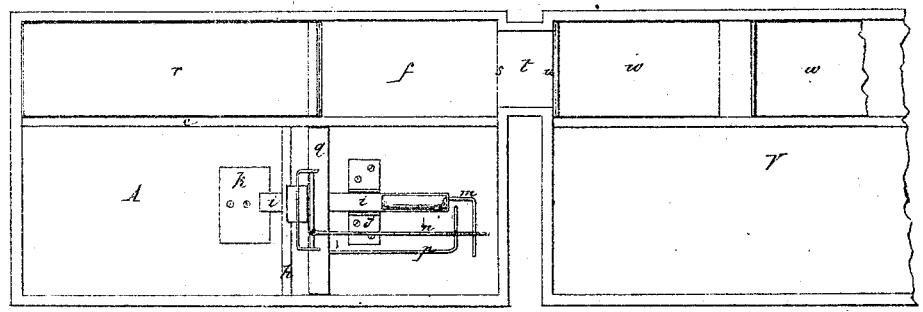
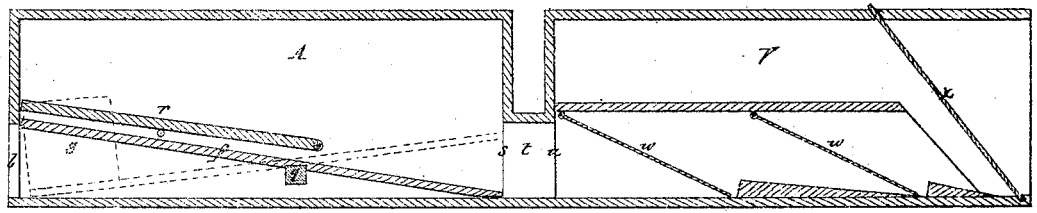
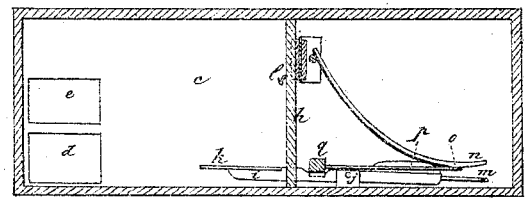
Witnesses
Joseph Biddle, Inventor.
by Geo. E. Brown,
his Attorney.

UNITED STATES PATENT OFFICE.

JOSEPH BIDDLE, OF EDINBURGH, PENNSYLVANIA.

IMPROVEMENT IN ANIMAL-TRAPS.

Specification forming part of Letters Patent No. 118,581, dated August 29, 1871.

*To all whom it may concern:*

Be it known that I, JOSEPH BIDDLE, of Edinburgh, Lawrence county, Pennsylvania, have invented certain Improvements in Animal-Traps, of which the following is a specification:

This invention relates to that class of devices in which the animal entering a trap, by its efforts to obtain the bait, effects the closing of the hole by which it came in and the opening of another hole that communicates with a passage leading into a separate receiver, having a glass window, from which receiver the animal is unable to escape.

Referring to the drawing—in which Figure 1 is a plan view of the trap and receiver with the covers removed; Fig. 2, a sectional elevation of the trap and receiver; and Fig. 3, a sectional elevation of the trap—

A is the trap, having a hole of ingress, $b$, in one end, which opens into one of the two compartments into which the trap is divided by the partition $c$, in which partition are two holes, $d\ e$, one above the other. A platform, $f$, hung on pivots lengthwise of the same compartment, is provided with a door, $g$, that closes either the hole $d$ or $e$, according to the position of the platform. When the door $g$ is raised, as shown in Fig. 2, the trap is set, so that the animal can pass through the hole $d$ into the main compartment. This is divided by a transverse partition, $h$, through the lower part of which passes the bar $i$, pivoted at $j$, and bearing on one end a plate, $k$, for the animal's feet to rest on as it strives after the bait suspended at $l$. At the other end of the bar $i$ is a finger, $m$. The animal's weight on the plate $k$ raises the finger $m$ against the lower end of a latch-bar, $n$, which is hung at its upper end to the side of the partition $h$. The function of the latch-bar is to hold down, by means of its tooth $o$, the arm $p$ of the rock-bar $q$ that is mounted crosswise of the trap and supports the platform $f$. When the arm $p$ is held down by the latch-bar $n$ the platform $f$ is in the position shown in Fig. 2. When the finger $m$ detaches the latch-bar from the arm $p$ the platform $f$ falls by its own weight, the door $g$ at the same time opening the hole $e$ and closing the hole $d$. This alarms the animal, which, seeking escape, passes through the hole $e$ upon an inclined leaf, $r$, supported in the side compartment above the platform $f$. The leaf $r$ prevents the animal from escaping through the hole $b$. The only apparent avenue of escape is the hole $s$ at the other end of the trap, and, as the animal approaches this its weight lowers the end of the platform $f$, so that the arm $p$ is caught by the tooth $o$ and the trap reset. A box, $t$, connects the holes $s$ of the trap with a hole, $u$, in the end of the receiver V. The hole $u$ opens into a compartment within the receiver, in which compartment are one or more inclined trap-doors, $w$, which the animal raises by passing under, and which it cannot lift after they fall behind it. The animal at length emerges into the main part of the receiver, which has a glass window, $x$, that can be raised to let the animal out.

I claim as my invention—

1. The combination of the plate $k$, bar $i$, finger $m$, latch-bar $n$, arm $p$, rock-bar $q$, platform $f$, and door $g$, as specified.

2. The combination of the trap A, leaf $r$, platform $f$, box $t$, and receiver V, as described.

JOSEPH BIDDLE.

Witnesses:
A. L. HAZEN,
J. D. BRYSON.